(12) United States Patent
Gailloux et al.

(10) Patent No.: US 10,469,650 B1
(45) Date of Patent: Nov. 5, 2019

(54) MOBILE COMMUNICATION DEVICE SELF-SERVICE CLIENT

(71) Applicant: Sprint Communications Company L.P., Overland Park, KS (US)

(72) Inventors: Michael A. Gailloux, Overland Park, KS (US); Kenneth W. Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/407,138

(22) Filed: May 8, 2019

Related U.S. Application Data

(63) Continuation of application No. 16/231,218, filed on Dec. 21, 2018, now Pat. No. 10,326,876.

(51) Int. Cl.
*H04M 3/42* (2006.01)
*H04M 1/725* (2006.01)
*H04L 29/08* (2006.01)
*H04M 3/51* (2006.01)

(52) U.S. Cl.
CPC ........ *H04M 1/72561* (2013.01); *H04L 67/02* (2013.01); *H04L 67/146* (2013.01); *H04M 3/5191* (2013.01)

(58) Field of Classification Search
None
See application file for complete search history.

(56) References Cited

U.S. PATENT DOCUMENTS

| 10,326,876 | B1  | 6/2019 | Gailloux et al. |
| 2013/0159081 | A1* | 6/2013 | Shastry ............. G06Q 30/0274 705/14.23 |
| 2017/0104874 | A1  | 4/2017 | Yi et al. |

OTHER PUBLICATIONS

Notice of Allowance dated Feb. 21, 2019, U.S. Appl. No. 16/231,218, filed Dec. 21, 2018.

* cited by examiner

*Primary Examiner* — Suhail Khan

(57) ABSTRACT

A system for providing targeted customer assistance to a wireless communication service subscriber comprising a mobile communication device comprising a processor; a display, a non-transitory memory, a radio transceiver, and a self-service client application. The client application comprises trigger signatures and phone numbers related to categories of customer service. The client application initiates a self-service session generates a key associated with the service subscriber, locates a log using the key, records current self-service event information, analyzes the self-service event information, wherein analyzing comprises at least determining a category of customer service of the event information. In response to the event information matching at least one trigger signature, selects a phone number associated with the category of customer service, presents the phone number via an embedded API, and calls a group associated with the category by invoking an embedded API of a dialer, wherein the log is transmitted to the group.

20 Claims, 7 Drawing Sheets

MOBILE COMMUNICATION DEVICE SELF-SERVICE CLIENT

CROSS-REFERENCE TO RELATED APPLICATIONS

This application is a continuation application to U.S. patent application Ser. No. 16/231,218, filed Dec. 21, 2018 and entitled "Mobile Communication Device Self-Service Client," which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are usually provisioned to receive service from a wireless communication service provider. A wireless communication service subscriber may experience issues related to the wireless communication service or mobile communication device. The service subscriber may initially attempt to resolve the issue using a self-service portal and become confused or fail to resolve the issue. The service subscriber may become frustrated or agitated with the wireless communication service provider and customer satisfaction may decrease. Service subscribers may be more inclined to switch service providers when they are dissatisfied with the level of customer service.

SUMMARY

In an embodiment, a system that processes historical self-service events and current self-service events of a wireless communication service subscriber to provide targeted customer assistance to the wireless communication service subscriber is disclosed. The system comprises a mobile communication device, comprising a processor, a display, a non-transitory memory, a radio transceiver, and a self-service client application comprising one or more trigger signatures and a plurality of phone numbers, each phone number related to a category of customer service. The self-service client application is stored in the non-transitory memory and, when executed by the processor generates a key associated with an account of a service subscriber, locates a log in a log data store using the key, wherein the log comprises a reference to the key and historical self-service event information from a self-service session of the account, records current self-service event information of the self-service session to the log, wherein an event is one of a dwell time, an error code, or a page reload, and analyzes the current and historical self-service event information stored in the log, wherein analyzing comprises at least determining a category of customer service of the event information. In response to the current and historical self-service event information matching at least one trigger signature of the log, selects a phone number associated with the category of customer service from the plurality of phone numbers, presents the selected phone number to the display of the mobile communication device, and upon selection of the phone number, calls a customer service group associated with the customer service category of selected phone number by invoking an embedded application programming interface (API) of a dialer of the mobile communication device, wherein the log associated with the account of the service subscriber is transmitted to the customer service group.

In another embodiment, a method that processes current and historical self-service event information associated with a wireless communication service subscriber to provide dynamically targeted customer assistance to the wireless communication service subscriber is disclosed. The method comprises generating a key by a self-service client application stored in a non-transitory memory of a mobile communication device associated with an account of a service subscriber, wherein the self-service client application comprises one or more trigger signatures and a plurality of phone numbers, each phone number related to a category of customer service, locating a log in a log data store using the key by the self-service client application, wherein the log comprises a reference to the key and historical self-service event information from historical self-service sessions of the account, and recording, by the self-service client application, current self-service event information of a self-service session to the log, wherein an event is one of a dwell time, an error code, or a page reload. The method further comprises analyzing, by the self-service client application, the current and historical self-service event information stored in the log, wherein analyzing comprises at least determining a category of customer service related to the event information, in response to the current and historical self-service event information matching at least one trigger signature of the log, selecting a phone number by the self-service client application associated with the category of customer service from the plurality of phone numbers, presenting, by the self-service client application, the selected phone number to a display of the mobile communication device, and upon selection of the phone number, calling a customer service group associated with the customer service category of selected phone number by the mobile communication device by invoking an embedded application programming interface (API) of a dialer of the mobile communication device by the self-service client application, wherein the log associated with the account of the service subscriber is transmitted to the customer service group In yet another embodiment, a method that processes current and historical self-service event information associated with a wireless communication service subscriber to provide dynamically targeted customer assistance to the wireless communication service subscriber is disclosed. The method comprises initiating a self-service session on a self-service web application executing on a server in a wireless communication network on a self-service portion of a web site via a web browser on an electronic device, wherein the self-service web application comprises one or more trigger signatures, generating a cookie associated with an account of a service subscriber by the self-service web application, wherein the cookie references account information of the service subscriber, locating a log comprising historical self-service event information in a log data store using the cookie by the self-service web application, wherein the log comprises a reference to the cookie, and recording, by the self-service web application, current self-service event information of the self-service session to the log, wherein an event is one of a dwell time, an error code, or a page reload. The method further comprises analyzing, by the self-service web application, the current and historical self-service event information stored in the log, wherein analyzing comprises at least determining a category of customer service of the event information, in response to the current and historical self-service event information matching at least one trigger signature, presenting a widget by the self-service web application on a display of the electronic device, wherein the widget invites the service subscriber to a chat session with a customer service group associated with the customer service category, and upon selection of the widget, connecting the service subscriber to a chat session with the customer service group by the self-service web application, wherein the log associated with the account of the service subscriber is transmitted to the customer service group.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
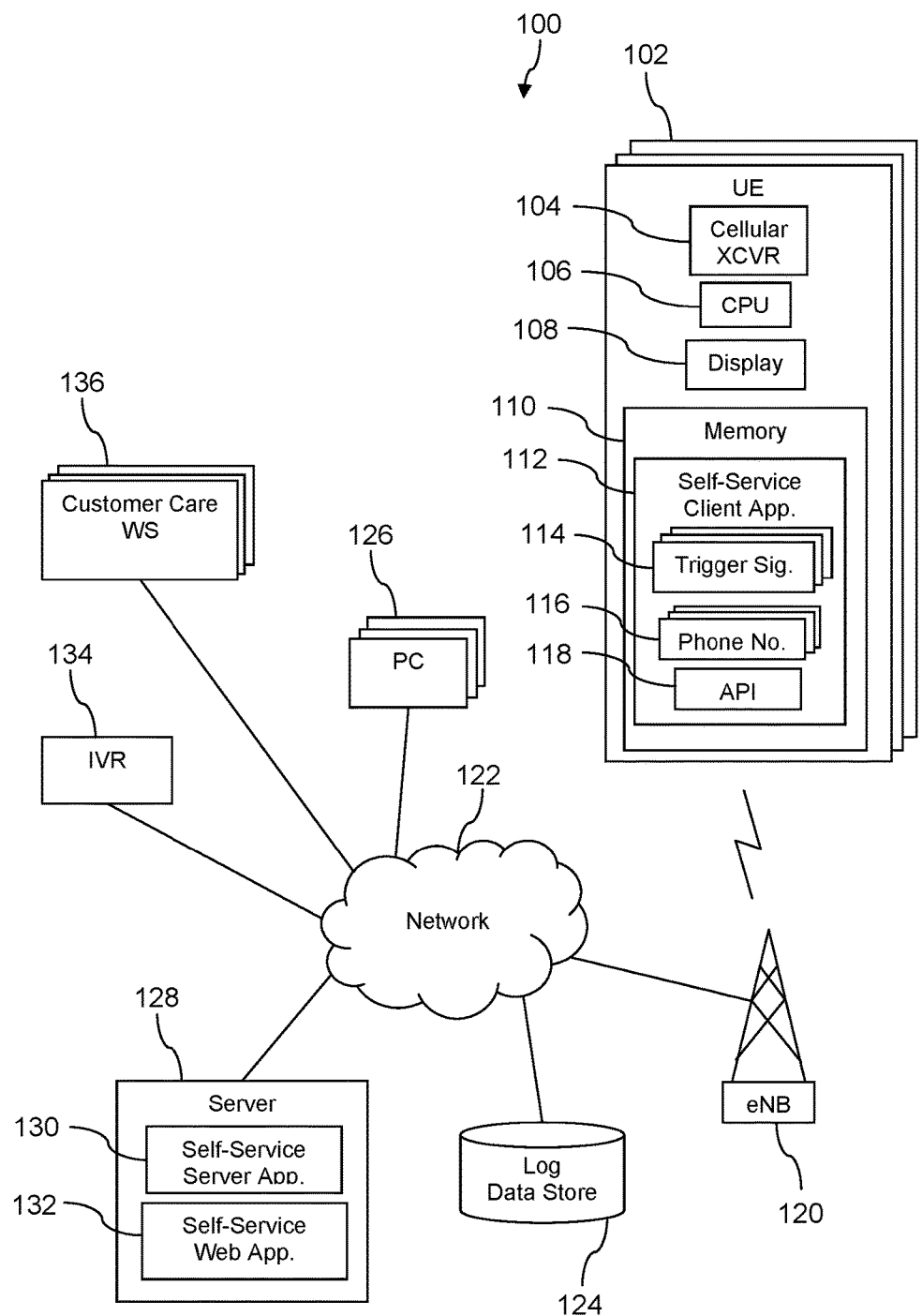
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Embodiments of the present disclosure teach a system and methods for dynamically providing targeted customer assistance to a service subscriber based on a determination that the service subscriber is struggling with a self-service customer assistance system. A service subscriber experiencing a problem related to wireless communication service or a mobile communication device may initiate a self-service session to resolve the issue. In an embodiment, the service subscriber may initiate a self-service session through a client application stored in a memory of the mobile communication device or by visiting a website associated with the service provider via a web browser of an electronic device, for example, a computer or the mobile communication device. While the present disclosure teaches examples using a client application on a mobile device, it should be appreciated that the current system and methods may be implemented by visiting a website via a web browser.

Upon initiating the self-service session, the self-service client application may create a key that references the account of the service subscriber and look up a log stored on the device or in a log data store associated with the service subscriber using the key. If the service subscriber initiates the self-service session on a web browser, a self-service web application stored in a server on the network may create a cookie with embedded account information. The cookie may be one of a session cookie, a persistent cookie, or a secure cookie. The self-service web application executing on the server may perform the functions described herein of the self-service client application based on events that occur in the self-service session on the website of the service subscriber. The log may comprise historical self-service event information from one or more previously transpired self-service sessions. The client application may record current event information of the self-service session to the log. For example, an event in a self-service session may be one or more of a dwell time, an error code, a page reload, an attempted invocation of an API, a visited web page, a selection of navigation buttons, a plurality of visited URLS, or an input of information. The client application may write information about these events to the log as the service subscriber navigates the self-service session.

In an embodiment, a self-service server application stored on the server in the network associated with the client application may manage the logs in the log data store. For example, the server application may search for and retrieve logs from the log data store using the key obtained from the client application. The server application may store logs in the log data store after the self-service session has been terminated by the service subscriber. In an embodiment, the historical event information may be stored in the log for a period of time before deletion. Historical event information may be evaluated as expired after a period of time and be deleted from the log. For example, historical event information may be stored for two weeks, three months, six months, one year, or any other period of time after which the historical event information is deleted. The server application may monitor, evaluate, and delete expired historical event information from the log.

Expired historical event information of the log may be deleted and the remainder of the historical event information that has not expired may be maintained in the log. For example, a log comprising historical event information that is eleven months old, eight months old, and three months old may delete the eleven-month-old historical event information when it ages to one year old and keep the younger historical event information until it ages out. Whenever a service subscriber initiates a new self-service session, the client application may append the current event information to the log, wherein the log associated with a particular service subscriber comprises a key or cookie that provides a reference to the particular service subscriber. In an embodiment, the key may be generated when a subscriber initially accesses the client application, and the key may be stored in the client application to be reused thereafter.

For example, a service subscriber may initiate a self-service session on a self-service client application on a mobile communication device to pay a monthly invoice. The service subscriber may have trouble navigating the self-service session and visit many pages unrelated to paying the invoice before reaching the correct page. Upon initiating the self-service session, the self-service client application may create or use a previously created key that references the service subscriber and search for a log comprising the key in a log data store on the network (e.g., search a data store managed by a computer accessible via the wireless communication service provider's network). The key may comprise information related to a first name, a last name, a phone number, or other information identifying the service subscriber. The client application may locate the log and record the pages visited by the service subscriber and/or the dwell time spent on each page of the log. The process of initiating a self-service session, visiting extraneous pages, and paying the invoice may repeat periodically for several months, for example once a month for three months, and the self-service client application may append the event information from each session to the log.

In an embodiment, the self-service client application may not locate a log comprising the key that references the service subscriber. For example, a service subscriber may initiate a self-service session for the first time on a mobile communication device or a new service subscriber that has been recently provisioned to receive wireless communication service from a service provider may not have historical event information to store on a log. For another example, a service subscriber may not initiate a self-service session for a period of time, and the historical event information stored on the log may become deleted before the next time a self-service session is initiated. The self-service client application may generate a log comprising the key that references the service subscriber and store it in the log data store if a log is not located. The self-service client application may then record current event information of the self-service session to the log as the service subscriber navigates the self-service session.

The log may comprise one or more trigger signatures, or thresholds, associated with the historical and current event information stored on the log. A trigger signature may represent a metric that determines the service subscriber is struggling or having trouble with the self-service session. For example, a trigger signature may be a dwell time of at least five minutes. For another example, a trigger signature may be four page reloads associated with resetting an account password. In an embodiment, a trigger signature may be a combination of events that occur from previous and current self-service sessions. The self-service client application may analyze the log as the service subscriber navigates the self-service session. Analyzing may comprise determining a category (e.g., billing, password, orders, account, upgrades) of customer service based on the event information. Once a trigger signature is matched by one or more events from the log, the self-service client application may determine an action to take based on the one or more log files or based on the trigger signature matched.

In an embodiment, the self-service client application further comprises a plurality of phone numbers, each associated with a customer service category (e.g., billing, password, orders, account, upgrades) of the service provider. Different trigger signature thresholds may exist for different customer service categories. For example, a trigger signature related to paying a bill may comprise a dwell time of five minutes, and a trigger signature related to ordering a new device may comprise a dwell time of twenty minutes. The self-service client application may determine a category associated with the self-service session and select a phone number associated with the category to provide to the service subscriber on a display of the mobile communication device. The client application may invoke an embedded API of the dialer of the mobile device based on an input from the service subscriber and call a customer service group with experience resolving issues related to the category. In some embodiments, the self-service client application may connect the service subscriber to a point in an interactive voice response (IVR) customer assistance system, wherein the self-service client application has navigated through the IVR system based on the event information.

In an embodiment, the self-service client application may automatically update one or more trigger signatures based on feedback from the service subscriber. For example, if a service subscriber initially rejects the provided phone number to reach customer service, the self-service client application may update the trigger signature to wait longer before providing the phone number (e.g., from a five minute dwell time to a seven minute dwell time). In another example, a service subscriber may express frustration to the customer service representative, and the self-service client application may update the trigger signature based on an input from the customer service representative to reduce the number of attempted page reloads before interjecting. Updating a trigger signature may improve the self-service experience for a service subscriber by determining the difference between customer frustration and satisfaction while using the self-service customer assistance system.

The client application may provide relevant event information from the log to the customer service representative so that the service subscriber does not have to reiterate his or her journey through the self-service session. Dynamically targeting customer assistance may improve customer satisfaction and reduce customer frustration with the service provider. Providing a log comprising event history to the customer service representative may also reduce customer frustration so that he or she does not have to repeatedly restate the issue at each level in the customer service process.

The self-service client and the self-service server taught herein provide an improved and more efficient computer system in that the system provides for both more efficient and satisfying assistance to the customer but further employs the computer system resources more efficiently, both the computing resources provided by the self-service server and the computing resources provided on the mobile communication device. By triggering to various direct routes to specific categories of assistance, processing burdens on the server system may be decreased (because the processing that would otherwise take place while the user wanders to a solution need not take place). In part this improved efficiency is achieved by providing processing on the mobile communication device, in executing the self-service client. But this is not merely relocating the processing burden to the edge, it is also streamlining the processing of the self-service client executing on the mobile communication device based on the collection and analysis of logs and the generation of triggering signatures based on that analysis on the server.

Turning now to FIG. 1, a system 100 is described. In an embodiment, the system 100 comprises a user equipment (UE) 102 that comprises a cellular radio transceiver 104, a processor 106, a display 108, and a memory 110 that comprises a self-service client application 112. The self-service client application 112 may be stored in a non-transitory portion of the memory 110. The cellular radio transceiver 104 may establish a wireless communication link with a cell site 120 according to one or more of a long term evolution (LTE), code division multiple access (CDMA), global system for mobile communication (GSM), or worldwide interoperability for microwave access (WiMAX) wireless telecommunications protocol. The system 100 may comprise a personal computer 126 (PC), wherein the PC 126 may be an Internet accessible electronic device such as, but not limited to, a laptop computer, a notebook computer, or a tablet computer.

In some instances, the UE 102 may be referred to as a mobile communication device 102. The cell site 120 may communicatively couple the device 102 to a network 122 to promote the device 102 placing voice calls or establishing data communication sessions. The device 102 may be a mobile phone, a smart phone, a personal digital assistant (PDA), a wearable computer, a headset computer, a laptop computer, a tablet computer, or a notebook computer. The network 122 may comprise one or more public networks, one or more private networks, or a combination thereof. At least a portion of the network 122 may be operated by a wireless communication service provider. The system 100 may comprise any number of mobile communication devices 102, any number of cell sites 120, and any number of PCs 126. In an embodiment, the system 100 may comprise tens of millions of mobile devices 102 and tens of thousands of cell sites 120.

In an embodiment, the mobile device 102 may be provisioned to receive wireless communication services from a service provider over the network 122. A service subscriber may experience problems with the mobile device 102 or the wireless communication service or desire to change an account feature at some point. A service subscriber may also desire to make payments, review account history, or manage account information. The service subscriber may use a self-service portal managed by the service provider to resolve the issue without the subscriber engaging with a live customer service representative. For example, the service subscriber may pay a bill, order a new mobile device 102, add/remove features to the plan (e.g., increase data usage limits, add international calling, reduce messaging quotas), and/or change account settings. The service subscriber may sign-in to his or her account with the service provider, or the service provider may otherwise identify the service subscriber through information obtained from the mobile device 102 (e.g., phone number, IMEI, serial numbers).

The system 100 may further comprise a log data store 124 comprising logs with historical event information and a server 128 comprising a self-service server application 130 and a self-service web application 132 that are stored in a memory (not shown) and executing on a processor (not shown) of the server 128. The system 100 may comprise any number of log data stores 124, for example, tens of thousands of log data stores 124, each log data store 124 comprising tens of thousands of logs. The self-service portal may be accessed via a client application 112 stored in the memory 110 of the mobile device 102 or accessed using a web browser of a PC 126. The web application 132 may perform actions to dynamically provide customer service to a service subscriber struggling with a self-service session on a PC 126.

The service subscriber may initiate a self-service session on the mobile device 102 using the self-service client application 112. The client application 112 may create a key that references the account of the service subscriber. For example, the key may embed information such as a first name, a last name, a phone number, a type of mobile device 102, a model of mobile device 102, or any combination thereof. The self-service client application 112 may look up and locate a log associated with the service subscriber's account using the key and record current event information to the log as the service subscriber progresses through the self-service session. A current event recorded during the self-service session may be one or more of a dwell time, an error code, a page reload, an attempted invocation of an API, a visited web page, an input of information in text fields, a selection of navigation buttons or URLs, or any combination thereof. The log may be stored in the log data store 124 and/or stored in the memory 110 of the mobile device 102.

Alternatively, the service provider may manage a web site with a portion dedicated to self-service, and the service subscriber may initiate a self-service session on a PC 126 (e.g., a laptop) via a web browser. The subscriber may validate his or her identity by logging in to a password secured account or other providing credentials for proof of identity. The web application 132 may generate a cookie with embedded account information such as a first name, a last name, a phone number, a type of mobile device 102, a model of mobile device 102, or any combination thereof and look up a log associated with the service subscriber's account using the cookie and record current event information to the log as the service subscriber progresses through the self-service session.

In an embodiment, the server application 130 may perform some of the back-end actions of the client application 112 and the web application 132. For example, the server application 130 may manage the logs in the log data store. The server application 130 may search for and retrieve logs from the log data store 124 using the key or cookie. The server application 130 may store logs in the log data store 124 after the self-service session has been terminated. In an embodiment, the historical event information may be stored in the log for a period of time before deletion. Historical event information may be evaluated as expired after a period of time and be deleted from the log. For example, historical event information may be stored for two weeks, three months, six months, one year, or any other period of time after which the historical event information is deleted. The server application 128 may monitor, evaluate, and delete expired historical event information from the log.

In some embodiments, a log associated with the service subscriber may not be located. For example, a service subscriber may initiate a self-service session for the first time on a mobile device 102 or a new service subscriber that has been recently provisioned to receive wireless communication service from the service provider may not have historical event information to store on a log. For another example, a service subscriber may not initiate a self-service session for a period of time, and the historical event information stored on the log may become deleted before the next time a self-service session is initiated. The self-service client application 112 may generate a log comprising the key that references the service subscriber and store it in the log data store 124 if a log is not located. The key may be generated during an initial self-service session and stored in the client application 112 to be reused in subsequent self-service sessions. The self-service client application 112 may then record current event information of the self-service session to the log as the service subscriber navigates the self-service session.

As the self-service client application 112 records current event information, the self-service client application 112 may analyze the historical and current event information stored on the log. Analyzing the log comprises at least determining a category of customer service based on the self-service session (e.g., billing, orders, account, settings). The self-service client application 112 may further comprise a plurality of trigger signatures 114, a plurality of phone numbers 116, and an embedded application programming interface (API) 118 of a dialer of the mobile device 102. A trigger signature 114 may represent a threshold of events, and upon matching the trigger signature 114, the self-service client application 112 interjects the self-service session via the embedded API 118 to offer targeted customer assistance to the service subscriber. For example, a trigger signature 114 may comprise a service subscriber reloading a page three times. A trigger signature 114 may also comprise a series of events, for example, a service subscriber may enter an incorrect password, attempt to reset their password, navigate elsewhere on the session, and abandon the self-service session by exiting the self-service client application 112.

The system 100 may further comprise an interactive voice response (IVR) system 134 and a plurality of customer care work stations 136. The customer care work stations 136 may each be in a distinct geographical location. Each phone number 116 stored in the self-service client application 112 may belong to a category of customer service. The phone number may be a standard 10-digit phone number or a dial code that contacts the customer service group related to the category of customer service. In an embodiment, when a trigger signature 114 is matched by the historical and current event information in the log, the self-service client application 112 may select a phone number 116 associated with the determined category of customer service of the self-service session. The phone number 116 may be a direct line to a point in an interactive voice response (IVR) system 134 or to a customer care workstation 136 that comprises a customer service group with experience assisting customers regarding issues related to the category of customer service. The self-service client application 112 may present the phone number 116 on the display 108 of the mobile device 102. The service subscriber may select the phone number 116, and the client application 112 may invoke the embedded application programming interface (API) 118 of the dialer of the mobile device 102 and call the phone number 116 of the IVR system 134 or the customer care work station 136. In an embodiment, calling the phone number 116 may place the service subscriber in a prioritized position of a queue for connecting with the customer service group.

In another embodiment, calling the phone number 116 may dial an IVR system 134 of the service provider, wherein the self-service client application 112 navigates through the menu system before the service subscriber becomes connected. The self-service client application 112 may provide the log comprising historical and current event information to the customer service group to inform the representative of the nature of the problem. For example, if the self-service client application 112 determines that the service subscriber is having problems with resetting a password of their account, offering targeted customer assistance to the service subscriber may comprise providing a dial code of a customer service group responsible for the account settings category. Alternatively, the web application 132 may present a widget to the web browser of the PC 126 inviting the service subscriber to join a chat box with customer service in response to events on the log matching at least one trigger signature 114. The web application 132 may provide the log comprising historical and current event information to the customer service group to inform the representative of the nature of the problem.

Figure 2:
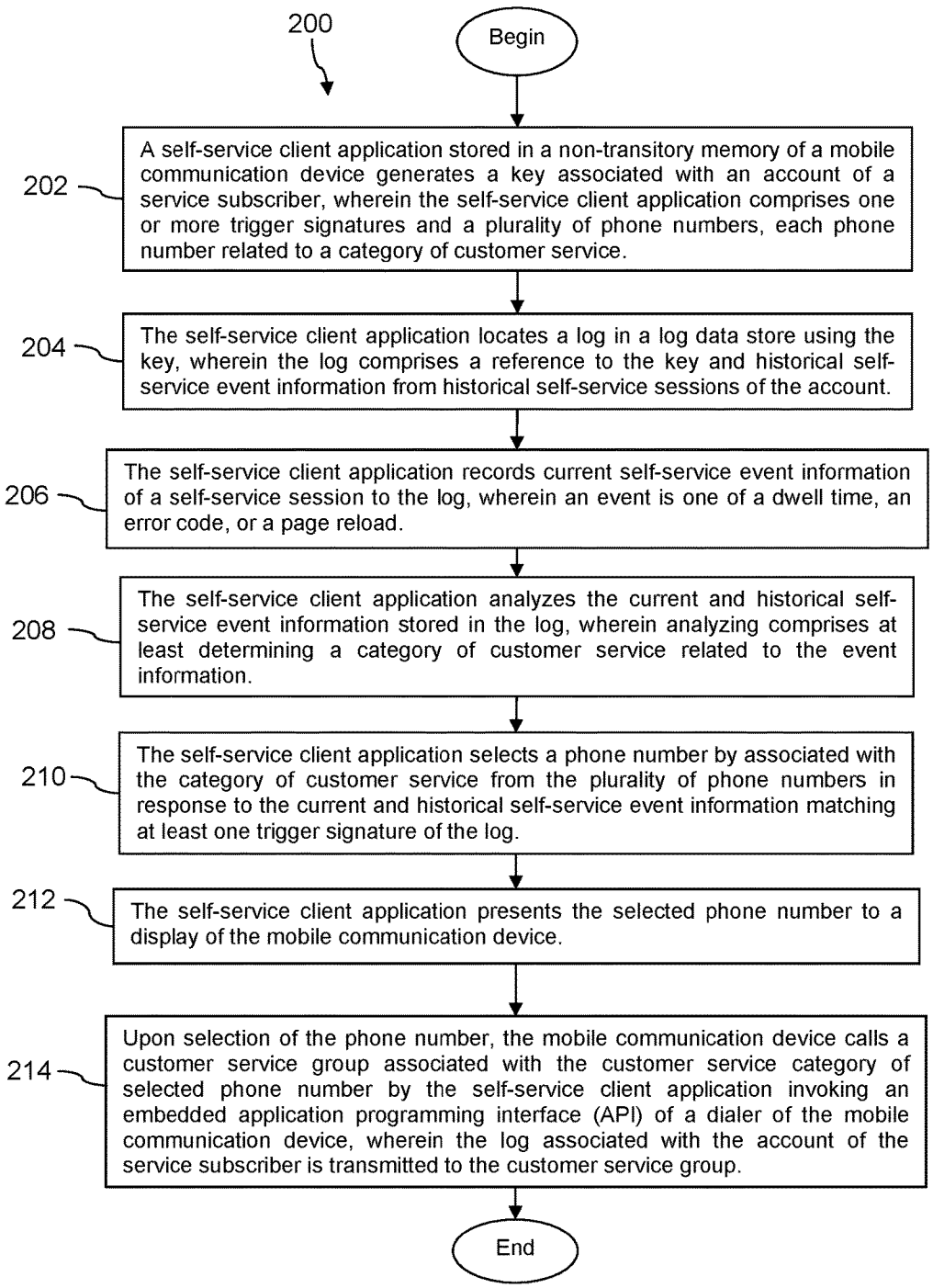
FIG. 2 is a flow chart according to an embodiment of the disclosure.

Turning now to FIG. 2, a method 200 is described. At block 202, a self-service client application stored in a non-transitory memory of a mobile communication device generates a key associated with an account of a service subscriber, wherein the self-service client application comprises one or more trigger signatures and a plurality of phone numbers, each phone number related to a category of customer service. The key may comprise service subscriber information such as a first name, a last name, or a phone number. The key may be generated during an initial access to self-service and stored in the self-service client application to be used in subsequent self-service sessions. At block 204, the self-service client application locates a log in a log data store using the key, wherein the log comprises a reference to the key and historical self-service event information from historical self-service sessions of the account. At block 206, the self-service client application records current self-service event information of a self-service session to the log, wherein an event is one of a dwell time, an error code, or a page reload. At block 208, the self-service client application analyzes the current and historical self-service event information stored in the log, wherein analyzing comprises at least determining a category of customer service related to the event information. For example, a category of customer service may be one of an account category, a billing category, a device category, or a service plan category.

At block 210, the self-service client application selects a phone number by associated with the category of customer service from the plurality of phone numbers in response to the current and historical self-service event information matching at least one trigger signature of the log. Trigger signatures may differ based on the category of customer service. For example, some categories of customer service may comprise trigger signatures that allow for more repetitions or time before the self-service client application interrupts the self-service session. At block 212, the self-service client application presents the selected phone number to a display of the mobile communication device. At block 214, upon selection of the phone number, the mobile communication device calls a customer service group associated with the customer service category of selected phone number by invoking an embedded application programming interface (API) of a dialer of the mobile communication device, wherein the log associated with the account of the service subscriber is transmitted to the customer service group. In an embodiment, the mobile device may call an IVR system of the service provider and progress through the menu system to reach a customer service representative associated with the category of customer service.

Figure 3:
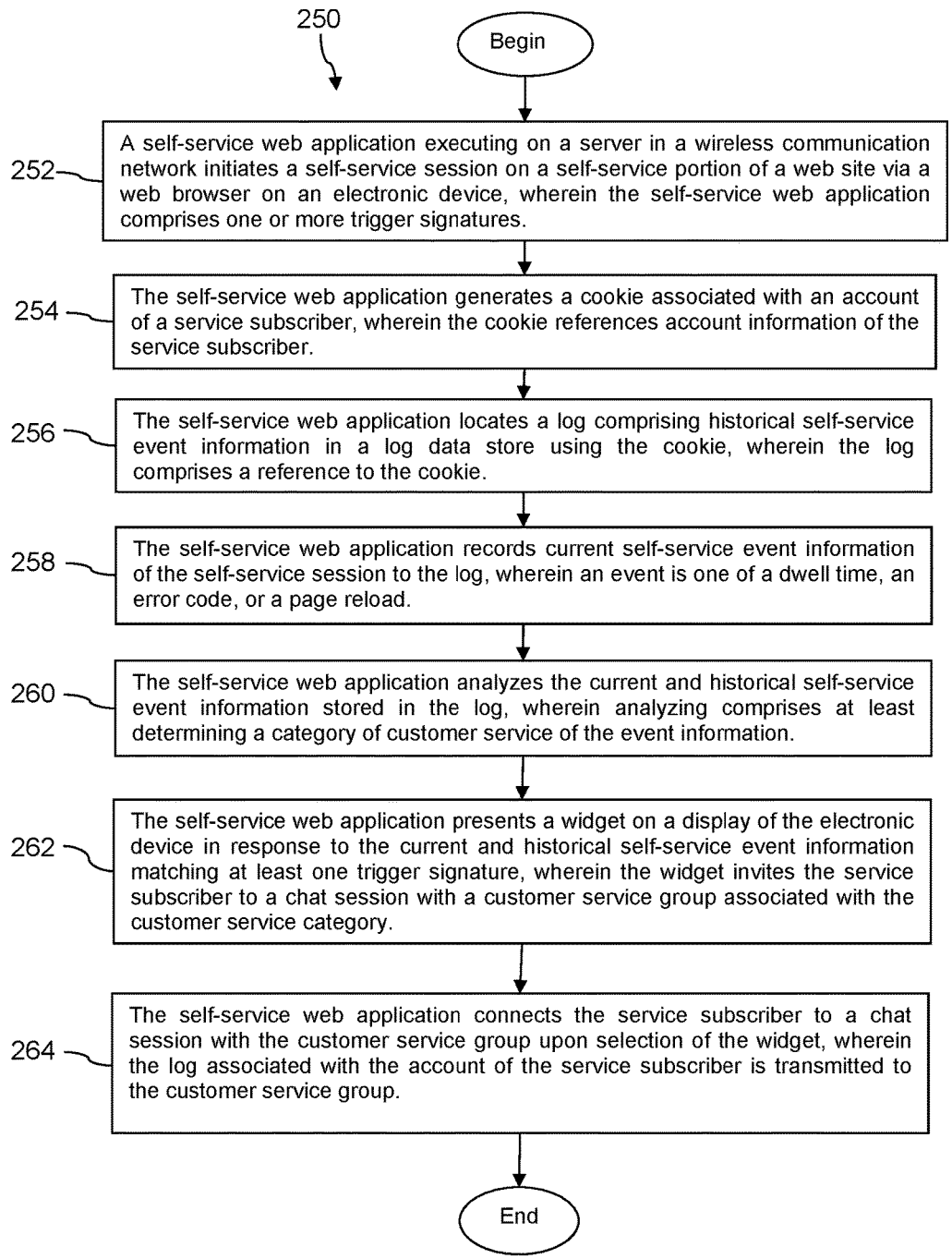
FIG. 3 is another flow chart according to an embodiment of the disclosure.

Turning now to FIG. 3, a method 250 is described. At block 252, a self-service web application executing on a server in a wireless communication network initiates a self-service session on a self-service portion of a web site via a web browser on an electronic device, wherein the self-service web application comprises one or more trigger signatures. The electronic device may be an Internet accessible electronic device, such as a smart phone, a personal computer, a laptop, a tablet, or a notebook computer. At block 254, the self-service web application generates a cookie associated with an account of a service subscriber, wherein the cookie references account information of the service subscriber. The cookie may be one of a session cookie, a persistent cookie, or a secure cookie comprising embedded service subscriber account information (e.g., first name, last name, phone number, mobile device IMEI, address). At block 256, the self-service web application locates a log comprising historical self-service event information in a log data store using the cookie, wherein the log comprises a reference to the cookie. At block 258, the self-service web application records current self-service event information of the self-service session to the log, wherein an event is one of a dwell time, an error code, or a page reload. In an embodiment, the service subscriber may elect to reject or ignore the presented phone number, and the self-service client application may resume the self-service session on the mobile device.

At block 260, the self-service web application analyzes the current and historical self-service event information stored in the log, wherein analyzing comprises at least determining a category of customer service of the event information. At block 262, the self-service web application presents a widget on a display of the electronic device in response to the current and historical self-service event information matching at least one trigger signature, wherein the widget invites the service subscriber to a chat session with a customer service group associated with the customer service category. At block 264, the self-service web application connects the service subscriber to a chat session with the customer service group upon selection of the widget, wherein the log associated with the account of the service subscriber is transmitted to the customer service group.

Figure 4:
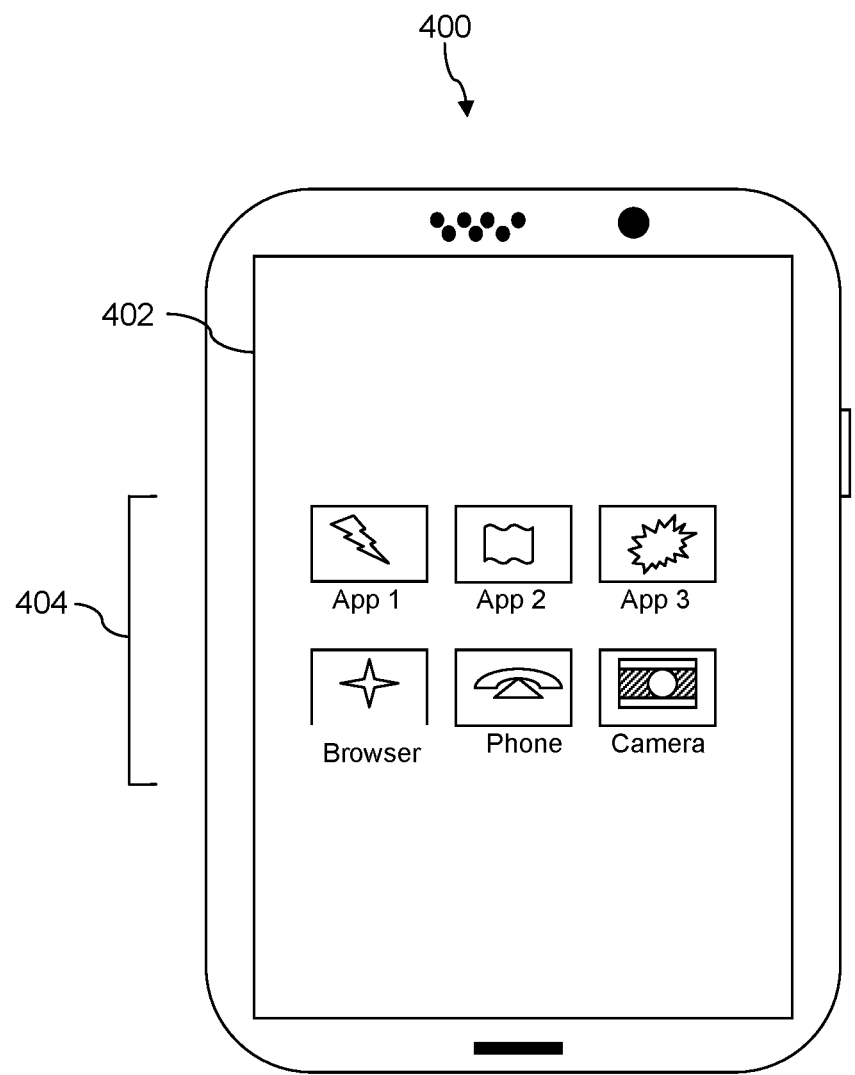
FIG. 4 is an illustration of a mobile communication device according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
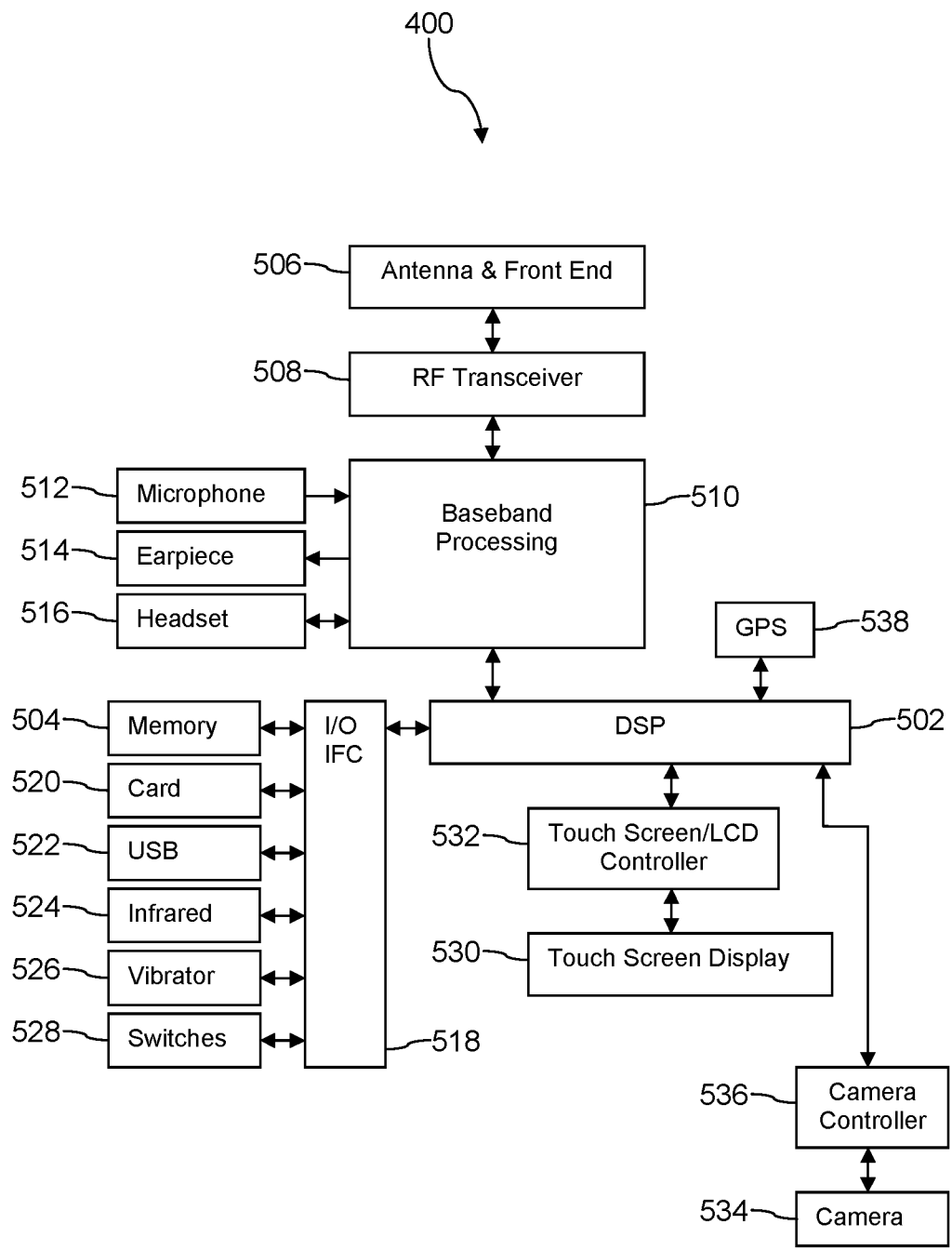
FIG. 5 is a block diagram of a hardware architecture of a mobile communication device according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
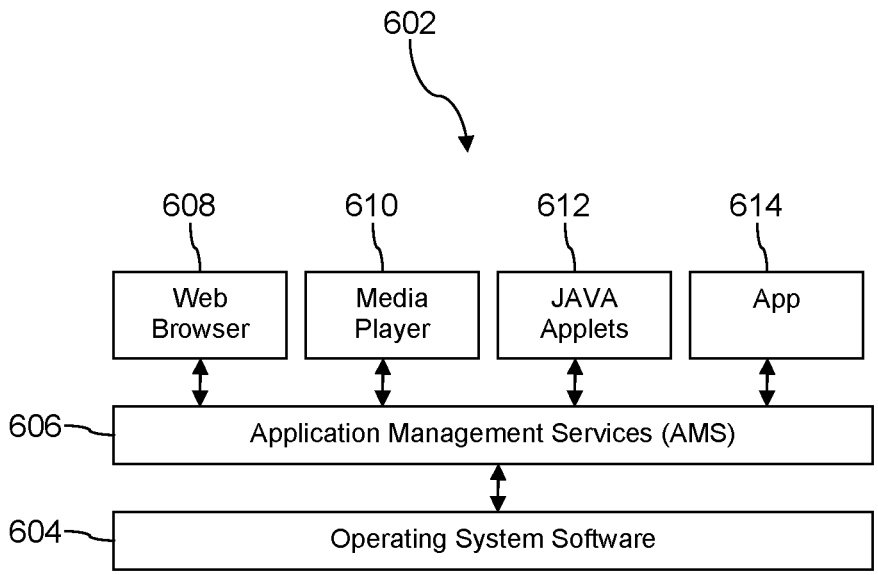
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
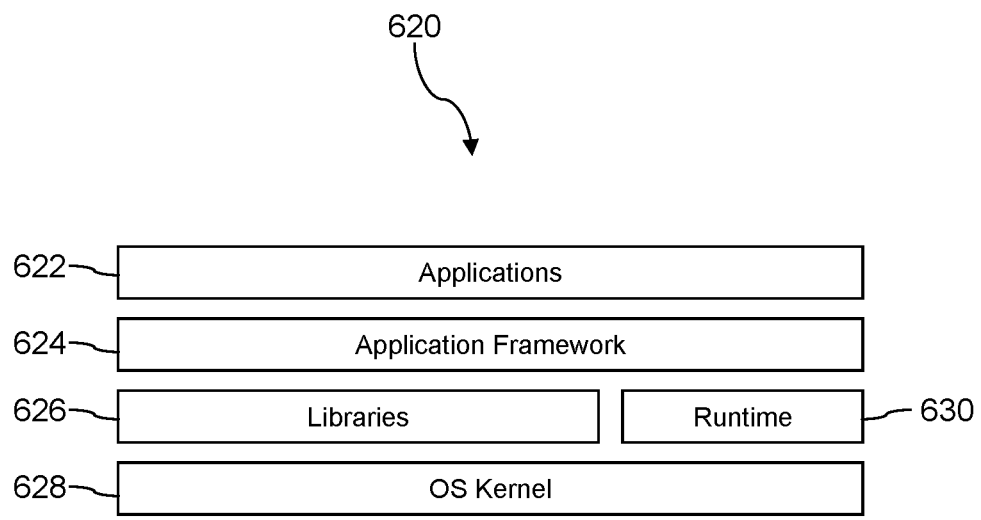
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
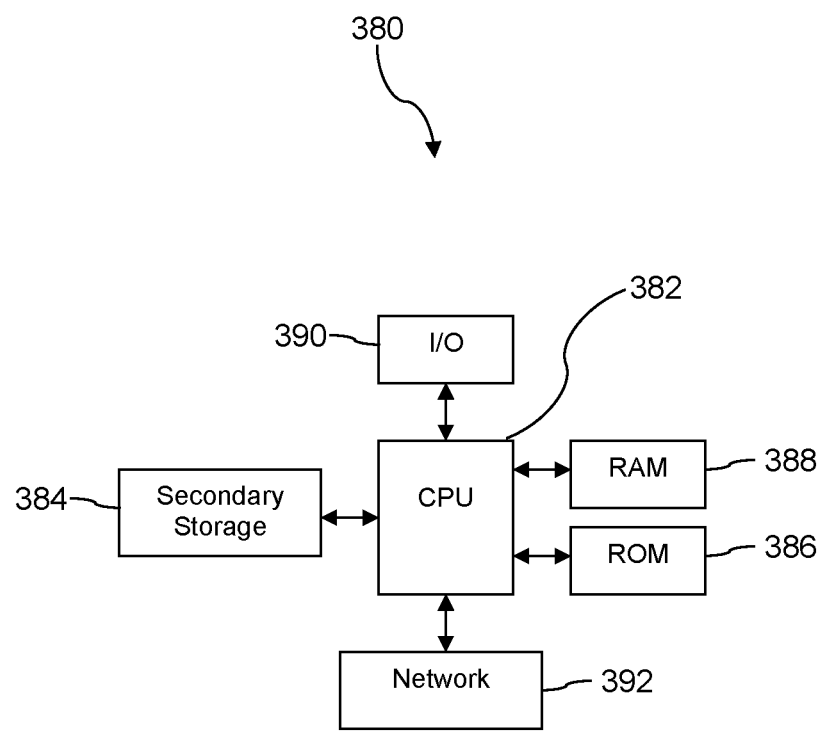
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method that processes current and historical self-service event information associated with a wireless communication service subscriber to provide dynamically targeted customer assistance to the wireless communication service subscriber, the method comprising:
   initiating a self-service session on a self-service web application executing on a server in a wireless communication network on a self-service portion of a web site via a web browser on an electronic device, wherein the self-service web application comprises one or more trigger signatures;
   generating a cookie associated with an account of the wireless communication service subscriber by the self-service web application, wherein the cookie references account information of the wireless communication service subscriber;
   searching for a log comprising historical self-service event information in a log data store using the cookie by the self-service web application, wherein the log comprises a reference to the cookie;
   recording, by the self-service web application, current self-service event information of the self-service session to the log, wherein an event is one of a dwell time, an error code, or a page reload;
   analyzing, by the self-service web application, the current and historical self-service event information stored in the log, wherein analyzing comprises at least determining a category of customer service of the current and historical self-service event information;
   in response to the current and historical self-service event information matching at least one trigger signature, presenting a widget by the self-service web application on a display of the electronic device, wherein the widget invites the wireless communication service subscriber to a chat session with a customer service group associated with the customer service category; and
   upon selection of the widget, connecting the wireless communication service subscriber to a chat session with the customer service group by the self-service web application, wherein the log associated with the account of the wireless communication service subscriber is transmitted to the customer service group.

2. The method of claim 1, wherein the electronic device is an Internet accessible electronic device.

3. The method of claim 1, further comprising after generating the cookie and in response to determining by the self-service web application that no log comprising the cookie exists in the log data store based on searching for the log:
   generating by the self-service web application the log comprising the cookie referencing the account of the wireless communication service subscriber; and
   storing the log in the log data store by the self-service web application.

4. The method of claim 1, wherein the self-service web application further comprises a plurality of phone numbers, each phone number related to a category of customer service, further comprising:
   in response to the current and historical self-service event information matching at least one trigger signature of the log, selecting a phone number by the self-service web application associated with the category of customer service from the plurality of phone numbers; and
   presenting, by the self-service web application, the selected phone number to a display of the electronic device, wherein calling the phone number transmits the log associated with the account of the wireless communication service subscriber to the customer service group.

5. The method of claim 4, wherein the plurality of phone numbers are dial codes referencing customer service groups associated with the categories.

6. The method of claim 4, wherein the plurality of phone numbers are standard 10-digit phone numbers.

7. The method of claim 1, wherein the category of customer service comprises billing, password, orders, account, or upgrades.

8. The method of claim 1, further comprising evaluating historical self-service event information as expired after a period of time and deleting expired historical event information from the log.

9. The method of claim 8, wherein the period of time is two weeks, three months, six months, or one year.

10. The method of claim 8, further comprising deleting the historical self-service event information of the log that has expired and maintaining the remainder of the historical self-service event information that has not expired in the log.

11. A system that processes historical self-service events and current self-service events of a wireless communication service subscriber to provide dynamically targeted customer assistance to the wireless communication service subscriber, the system comprising:
   a log data store that stores a plurality of logs; and
   a server comprising:
      a non-transitory memory that stores one or more trigger signatures;
      a processor; and
      a self-service web application stored in the non-transitory memory, that when executed by the processor:
         upon initiation of a self-service session on a self-service portion of a web site via a web browser on an electronic device, generates a cookie associated with an account of the wireless communication service subscriber, wherein the cookie references account information of the wireless communication service subscriber,
         searches for a log comprising historical self-service event information in the log data store using the cookie, wherein the log comprises a reference to the cookie,
         records current self-service event information of the self-service session to the log, wherein an event is one of a dwell time, an error code, or a page reload,
         analyzes the current and historical self-service event information stored in the log, wherein analyzing comprises at least determining a category of customer service of the current and historical self-service event information,
         in response to the current and historical self-service event information matching at least one trigger signature, presents a widget on a display of the electronic device, wherein the widget invites the wireless communication service subscriber to a chat session with a customer service group associated with the customer service category, and
         upon selection of the widget, connects the wireless communication service subscriber to a chat session with the customer service group, wherein the log associated with the account of the wireless communication service subscriber is transmitted to the customer service group.

12. The system of claim 11, wherein the self-service web application further:
 after generating the cookie and in response to determining that no log comprising the cookie exists in the log data store based on searching for the log:
  generates the log comprising the cookie referencing the account of the wireless communication service subscriber, and
  stores the log in the log data store.

13. The system of claim 11, wherein the self-service web application comprises a plurality of phone numbers, each phone number related to a category of customer service, and wherein the self-service web application further:
 in response to the current and historical self-service event information matching at least one trigger signature of the log, selects a phone number associated with the category of customer service from the plurality of phone numbers, and
 presents the selected phone number to a display of the electronic device, wherein calling the phone number transmits the log associated with the account of the wireless communication service subscriber to the customer service group.

14. The system of claim 13, wherein the plurality of phone numbers are dial codes referencing customer service groups associated with the categories.

15. The system of claim 13, wherein the plurality of phone numbers are standard 10-digit phone numbers.

16. The system of claim 11, wherein the category of customer service comprises billing, password, orders, account, or upgrades.

17. The system of claim 11, wherein matching a trigger signature comprises matching a plurality of events occurring in the log.

18. The system of claim 11, wherein the cookie comprises a session cookie, a persistent cookie, or a secure cookie.

19. The system of claim 11, wherein the electronic device is one of a mobile phone, a smart phone, a personal digital assistant (PDA), a wearable computer, a headset computer, a media player, a laptop computer, a notebook computer, or a tablet computer.

20. The system of claim 11, wherein the cookie comprises at least one of a first name, a last name, a phone number, or an identifier of the mobile communication device.

* * * * *